US008304697B2

(12) United States Patent
McGhee, Jr. et al.

(10) Patent No.: US 8,304,697 B2
(45) Date of Patent: Nov. 6, 2012

(54) METHOD AND SYSTEM FOR CONTROLLING SMOKER DEVICE INTEGRAL TO AN OVEN

(75) Inventors: Owen R. McGhee, Jr., Montville, OH (US); David R. Lastoria, Willoughby, OH (US); David S. Schwerzler, Chagrin Falls, OH (US)

(73) Assignee: Cleveland Range, LLC, Cleveland, OH (US)

( * ) Notice: Subject to any disclaimer, the term of this patent is extended or adjusted under 35 U.S.C. 154(b) by 656 days.

(21) Appl. No.: 12/383,654

(22) Filed: Mar. 27, 2009

(65) Prior Publication Data
US 2010/0247721 A1 Sep. 30, 2010

(51) Int. Cl.
*A21B 1/06* (2006.01)
*A21B 3/04* (2006.01)

(52) U.S. Cl. ........ 219/409; 219/400; 219/401; 219/680; 219/682; 99/482; 126/20; 126/21 A

(58) Field of Classification Search .................. None
See application file for complete search history.

(56) References Cited

U.S. PATENT DOCUMENTS

| 4,344,358 | A | * | 8/1982 | Maurer | 99/476 |
|---|---|---|---|---|---|
| 4,663,517 | A | | 5/1987 | Huff et al. | 219/404 |
| 5,710,409 | A | * | 1/1998 | Schwarzbacker et al. | 219/506 |
| 5,967,027 | A | * | 10/1999 | Higashimoto | 99/472 |
| 6,708,604 | B1 | * | 3/2004 | Deichler, Jr. | 99/482 |
| 7,157,668 | B2 | * | 1/2007 | Bartelick | 219/393 |
| 7,317,173 | B2 | * | 1/2008 | Bartelick et al. | 219/401 |
| 7,755,005 | B2 | * | 7/2010 | Bartelick et al. | 219/401 |
| 2005/0051038 | A1 | * | 3/2005 | Bartelick | 99/482 |
| 2005/0204934 | A1 | * | 9/2005 | Robertson | 99/482 |
| 2008/0066629 | A1 | * | 3/2008 | Bartelick et al. | 99/482 |
| 2008/0223357 | A1 | * | 9/2008 | Bartelick et al. | 126/21 A |
| 2010/0229896 | A1 | * | 9/2010 | Bartelick | 134/22.1 |

OTHER PUBLICATIONS

Search Report and Written Opinion dated May 24, 2010 for corresponding International Application No. PCT/US2010/028969.

* cited by examiner

*Primary Examiner* — Joseph M Pelham
(74) *Attorney, Agent, or Firm* — Ohlandt, Greeley, Ruggiero & Perle, L.L.P.

(57) ABSTRACT

A smoker device having a low profile fits beneath the lower most rack of an oven thereby allowing full use of all possible shelves of the oven. The smoker device comprises a uniquely shaped bi-level heater element that allows the smoker device pan to be cradled just above the bottom wall of the oven chamber. A method and system allow a processor control of the smoker device manually or automatically as a part of a programmed recipe.

24 Claims, 6 Drawing Sheets

SMOKER BOX DETAIL

METHOD AND SYSTEM FOR CONTROLLING SMOKER DEVICE INTEGRAL TO AN OVEN

FIELD OF THE INVENTION

This invention relates to an oven with a smoker device and a method and a system for controlling the smoker device and particularly for an oven that is capable of operating in a convection mode, a steaming mode and/or a smoking mode.

BACKGROUND OF THE INVENTION

Current implementations of smoking technology in combination ovens preclude the end user from using all of the rack capability when the smoker device is placed in the oven chamber. The current smoking devices are too large in the height dimension and, thus, become an obstacle to use of the lower rail positions, thereby reducing the cooking capacity and output. Current implementations of control of the smoker device do not provide for an integrated control of the smoking device together with other food preparation assemblies of the oven.

Thus, there is a need for an improved oven with a smoker device capability.

SUMMARY OF THE INVENTION

A first embodiment of an oven for cooking food products of the present disclosure comprises an oven chamber that includes at least one side wall and a bottom wall. A thermal unit supplies thermal energy to the oven chamber to cook a food product. A smoker assembly supplies smoke to the food product. A controller comprises a processor, a cook program and a smoke program. The processor executes the cook program and the smoke program to operate the thermal unit and the smoker assembly to supply thermal energy and smoke to cook the food product.

In one aspect of the first embodiment of the oven of the present disclosure, the cook program includes a plurality of cook procedures. The cook program invokes the smoke program when executing at least one of the cook procedures.

In another aspect of the first embodiment of the oven of the present disclosure, the oven further comprises a plurality of switches and a power source. The processor controls connections of the thermal unit and the smoker assembly in circuit with the power source to provide thermal energy and smoke in the oven chamber to cook the food product.

In another aspect of the first embodiment of the oven of the present disclosure, the thermal unit is a member of the group consisting of: a convection assembly, a steam assembly, a radiant heat assembly, a microwave and any combination thereof.

In another aspect of the first embodiment of the oven of the present disclosure, the oven further comprises a control panel. The smoke program is invoked by a user making a manual selection from the control panel.

In another aspect of the first embodiment of the oven of the present disclosure, the smoke program is invoked by the processor based on execution of instructions of the cook program.

In another aspect of the first embodiment of the oven of the present disclosure, the oven chamber comprises a plurality of pan racks that include a plurality of shelf holders. The smoker assembly comprises a heater element and a pan that contains a smoke media. The pan and the heater element are shaped for disposition in the oven chamber below a lowermost one of the shelf holders and above the bottom wall.

In another aspect of the first embodiment of the oven of the present disclosure, the heater element comprises an upper level, which extends through the side wall and a lower level that supports the pan below the lowermost shelf holder and above the bottom wall.

In another aspect of the first embodiment of the oven of the present disclosure, the heater element comprises first and second spaced apart legs in the upper level and in the lower level and a portion in the lower level that connects to the first and second legs. Each of the first and second legs includes an incline between the upper and lower levels.

In another aspect of the first embodiment of the oven of the present disclosure, the pan comprises a slot and wherein the lower level of the heater element is disposed in the slot.

In another aspect of the first embodiment of the oven of the present disclosure, the pan further comprises a plurality of apertures that allow smoke to pass into the oven chamber.

In another aspect of the first embodiment of the oven of the present disclosure, the pan further comprises a lid that is installed and removed in a sliding motion.

In another aspect of the first embodiment of the oven of the present disclosure, the pan further comprises a handle that is removably attached to the lid.

A method of the present disclosure cooks food in an oven that includes an oven chamber that includes at least one side wall and a bottom wall. The method comprises:

supplying thermal energy with a thermal unit to the oven chamber to cook a food product;

supplying smoke with a smoker assembly to the food product; and controlling a processor with a cook program and a smoke program to operate the thermal unit and the smoker assembly to supply thermal energy and smoke to cook the food product.

In one embodiment of the method of the present disclosure, the cook program includes a plurality of cook procedures, and wherein the cook program invokes the smoke program when executing at least one of the cook procedures.

In another embodiment of the method of the present disclosure, the processor controls connections of the thermal unit and the smoker assembly in circuit with a power source to provide thermal energy and smoke in the oven chamber to cook the food product.

In another embodiment of the method of the present disclosure, the thermal unit is a member of the group consisting of: a convection assembly, a steam assembly, a radiant heat assembly, a microwave and any combination thereof.

In another embodiment of the method of the present disclosure, the smoke program is invoked by a user making a manual selection from a control panel of the oven.

In another embodiment of the method of the present disclosure, the smoke program is invoked by the processor based on execution of instructions of the cook program.

In another embodiment of the method of the present disclosure, the oven chamber comprises a plurality of pan racks that include a plurality of shelf holders. The smoker assembly comprises a heater element and a pan that contains a smoke media. The pan and the heater element are shaped for disposition in the oven chamber below a lowermost one of the shelf holders and above the bottom wall.

In another embodiment of the method of the present disclosure, the heater element comprises an upper level, which extends through the side wall and a lower level that supports the pan below the lowermost rack and above the bottom wall.

In another embodiment of the method of the present disclosure, the pan comprises a slot and wherein the lower level of the heater element is disposed in the slot.

In a second embodiment of the oven of the present disclosure, the oven for cooking food products comprises an oven chamber comprising at least one side wall, a bottom wall, and a plurality of pan racks disposed on the side wall that include a plurality of shelf holders. A thermal unit supplies thermal energy to the oven chamber to cook a food product. A smoker assembly supplies smoke to the food product. The smoker assembly comprises a heater element and a pan that contains a smoke media. The pan and the heater element are shaped for disposition in the oven chamber below a lowermost one of the shelf holders and above the bottom wall.

In one aspect of the second embodiment of the oven of the present disclosure, the heater element comprises an upper level, which extends through the side wall and a lower level that supports the pan below the lowermost shelf holder and above the bottom wall.

In another aspect of the second embodiment of the oven of the present disclosure, the heater element comprises first and second spaced apart legs in the upper level and in the lower level and a portion in the lower level that connects to the first and second legs. Each of the first and second legs includes an incline between the upper and lower levels.

In another aspect of the second embodiment of the oven of the present disclosure, the pan comprises a slot and the lower level of the heater element is disposed in the slot.

In another aspect of the second embodiment of the oven of the present disclosure, the pan further comprises a plurality of apertures that allow smoke to pass into the oven chamber.

In another aspect of the second embodiment of the oven of the present disclosure, the pan further comprises a lid that is installed and removed in a sliding motion.

In another aspect of the second embodiment of the oven of the present disclosure, the pan further comprises a handle that is removably attached to the lid.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
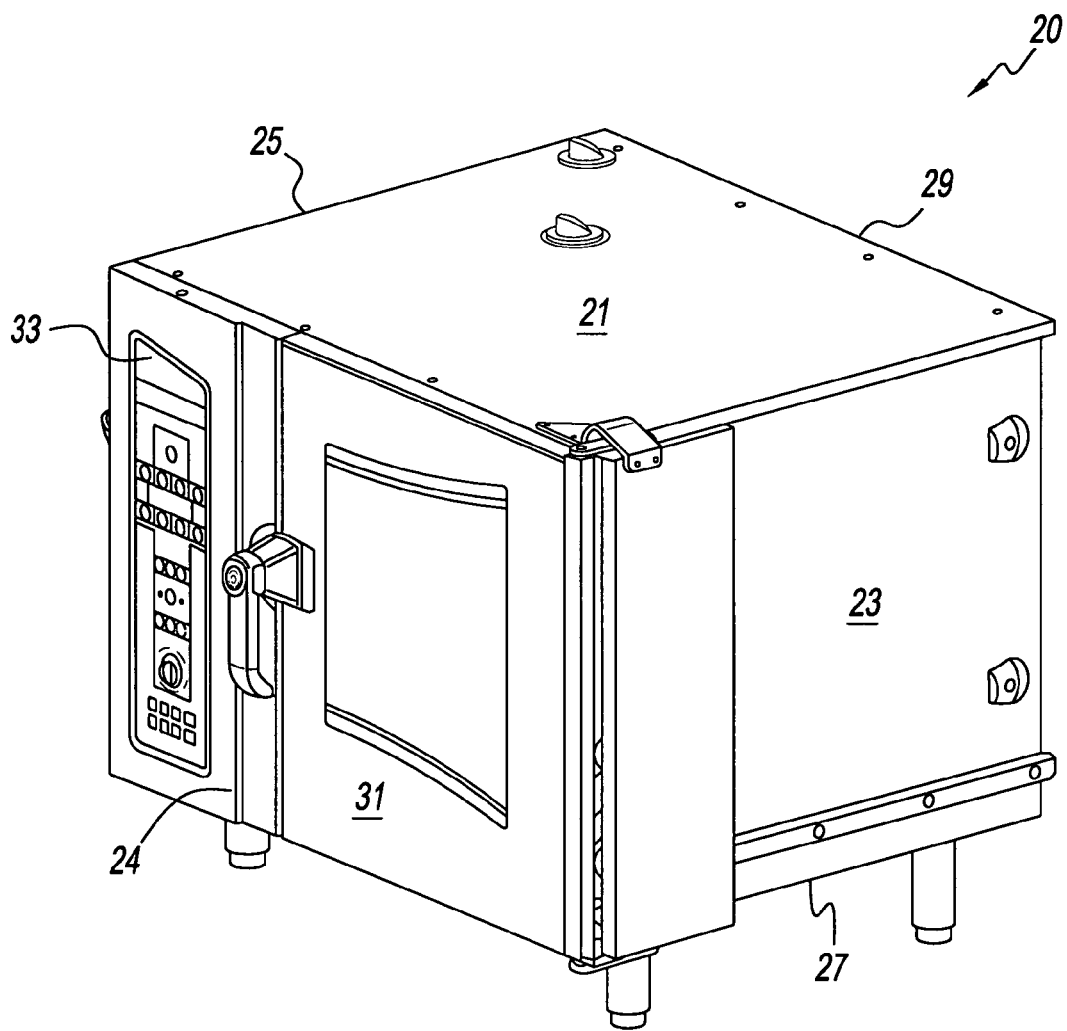
FIG. 1 is a perspective view of the oven according to the present invention.
Figure 2:
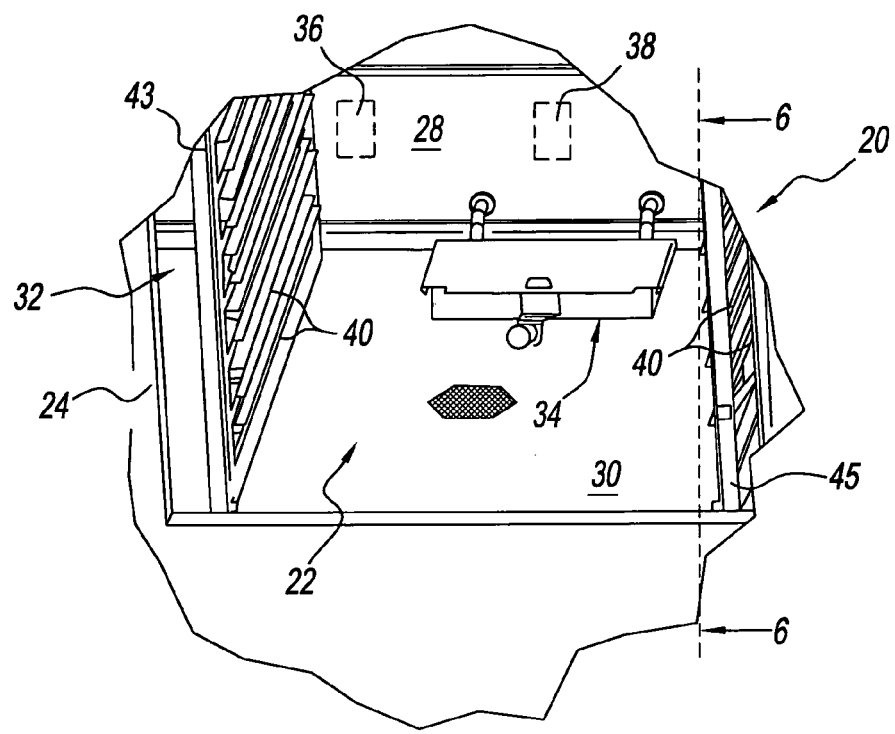
FIG. 2 is a partial perspective view of an internal structure of the oven of FIG. 1.
Figure 3:
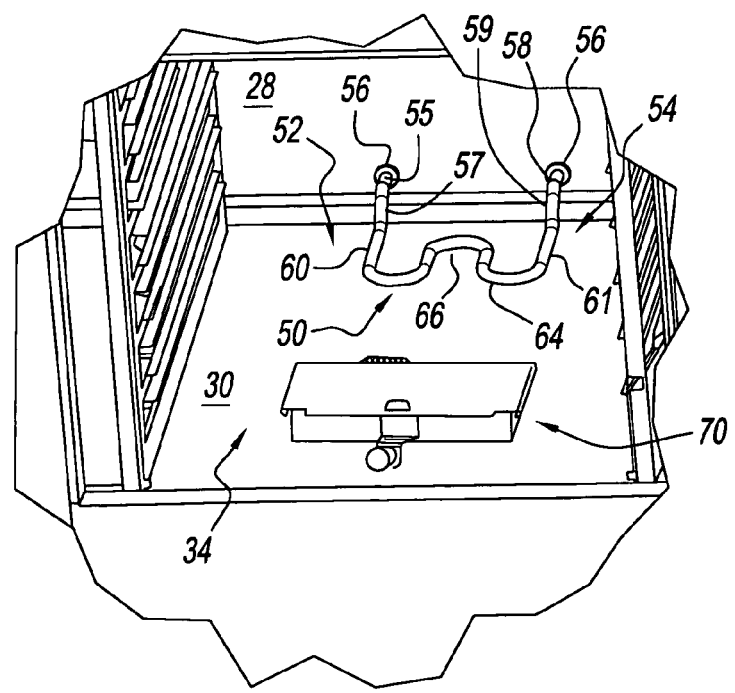
FIG. 3 is a partial perspective view of FIG. 2 with smoker assembly offset from installed position.

Referring to FIGS. 1-3, an oven system of the present invention comprises an oven 20 that includes an external structure that comprises an external top 21, an external side 23, and external side 25, an external bottom 27, an external back 29, a door 31 and a control panel 33. Oven 20 further includes an internal structure that is supported within the external structure and that comprises an oven chamber 22 defined by an internal back wall 28, an internal bottom wall 30, an internal top wall (not shown), an internal side wall 24 and an internal side wall (not shown) disposed opposite side wall 24 and offset internally of external side wall 23. Door 31 covers a front of oven chamber 22. A control section 32 is disposed behind control panel 33 outside of oven chamber 22 and between internal side wall 24 and external side wall 25. Oven 20 also includes a smoker assembly 34 and a thermal energy unit that comprises a steamer assembly 36 and a heater assembly 38. In alternate embodiments, the thermal unit may comprise steamer assembly 36, heater assembly 38, a microwave assembly (not shown) or a combination thereof.

Heater assembly 38 may be comprised of any suitable heater, such as a convection heater, a radiant heater and the like, that provides thermal energy to cook a food product. For the purpose of the present disclosure, heater assembly 38 is described herein as a convection heater, which comprises a fan (not shown) and a heater (not shown) that are disposed in a fan box (not shown) and that are in fluid communication with oven chamber 22 to circulate heated convection air between the fan box and oven chamber 22. The heater may be any suitable oven heater, such as gas, electric and the like. The fan is located to inject air into oven chamber 22 via one or more ingress openings and to suck air in from one or more egress openings of oven chamber 22. The ingress openings and egress openings may be located in any of the side walls 24 and 26, bottom wall 30, back wall 28 and the top wall (not shown). For example, the ingress openings may be located in the top wall (not shown) and the egress openings may be located in back wall 28.

Steamer assembly 36 is preferably located within oven 20, but outside oven chamber 22. For example, steamer assembly 36 is disposed to convert water into steam in the circulating hot air flow by flashing water on a heated surface, such as the convection air heater or a surface, which it heats, such as blades of the fan. Alternately, steamer assembly 36 can be independent of oven 20 with steam generated by steamer assembly 36 being conveyed to oven 20 via a tube, pipe or other conduit.

Figure 6:
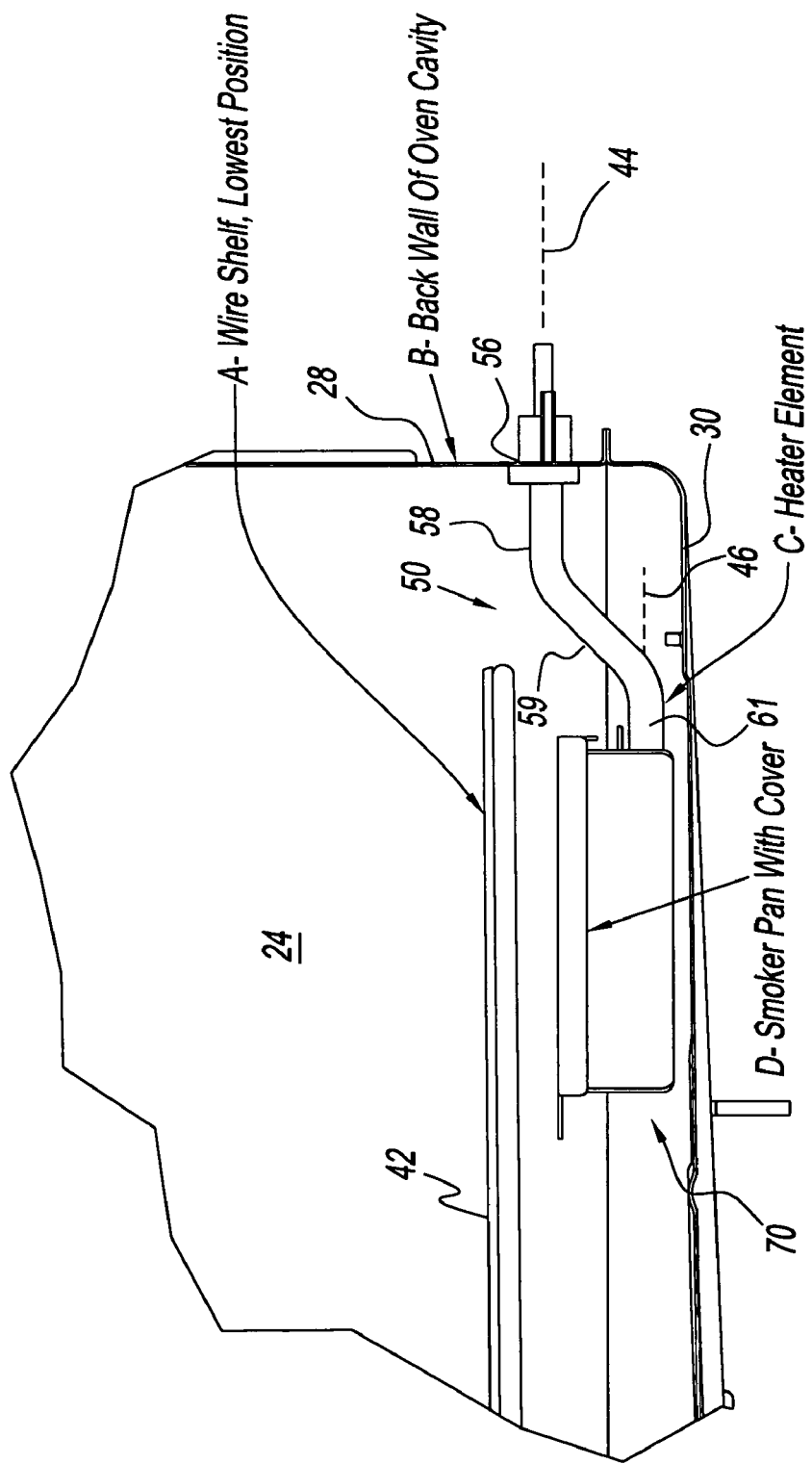
FIG. 6 is a view taken along line 6 of FIG. 2.

Referring to FIGS. 2 and 3, a pair of spaced apart pan racks 43 and 45 is disposed in oven chamber 22. Pan racks 43 and 45 each comprise a plurality of shelf holders 40 to hold wire shelves 42, of which one wire shelf is shown in FIG. 6. In alternate embodiments, steaming or baking pans can be used instead of wire shelves.

Referring also to FIGS. 2-6, smoker assembly 34 comprises a heater element 50 and a pan 70. Heater element 50 comprises two side rails 52 and 54 that are threaded through openings 56 in back wall 28 and that are connected at their distal ends to a connector rail 64. Heater element 50 is connected via side rails 52 and 54 in electrical circuit with a switch and a power source as described hereinafter. Heater element 50 is located just above bottom wall 30 and far enough below the lowest rack 40 to allow enough space for pan 70 without any interference with the lowermost shelf 42 as shown in FIG. 6.

In a preferred embodiment, side rail 52 has a high level member 55 that is connected to a low level member 60 via an angled member 57 and side rail 54 has a high level member 58 that is connected to a low level member 61 via an angled member 59. The distal ends of side rail lower members 60 and 61 are interconnected via a bridge member 64 that contains a U-shaped bend 66 between and at the same level as lower members 60 and 61. As shown in FIGS. 3 and 6, high level members 55 and 58 of heater element 50 enter oven chamber 22 via openings 54 in back wall 28 at a first high level 44 above bottom wall 30. Heater element 50 then angles or inclines downwardly via angled members 57 and 59 to low level members 60 and 61, which are at a second low level 46 above and closer to bottom wall 30.

Figure 4:
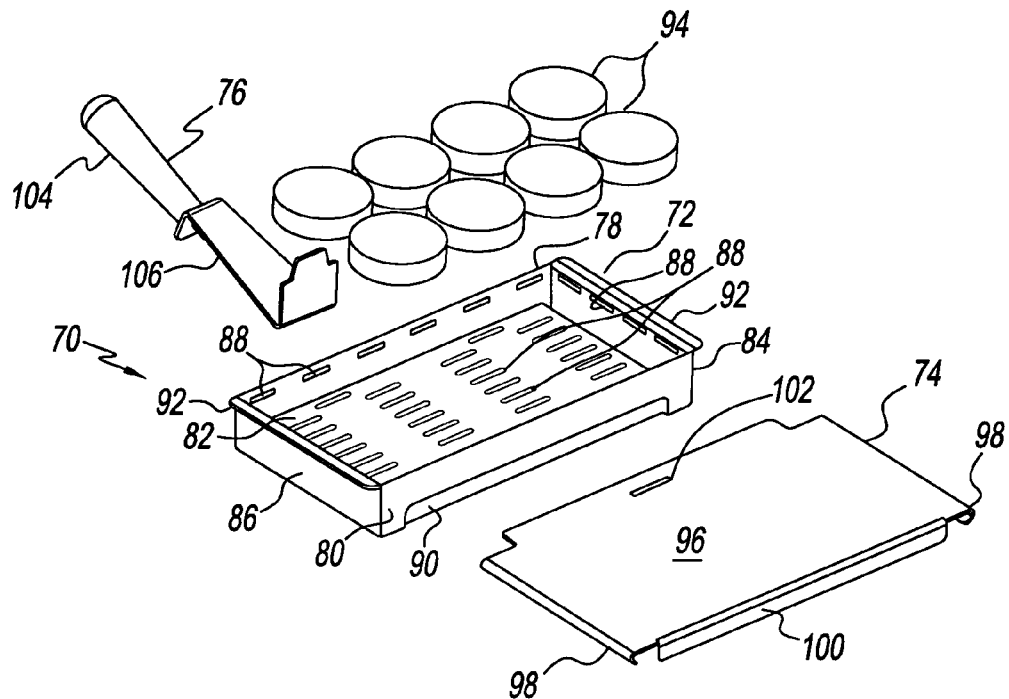
FIG. 4 is a perspective view of the smoker assembly disassembled of the oven of FIG. 1.
Figure 5:
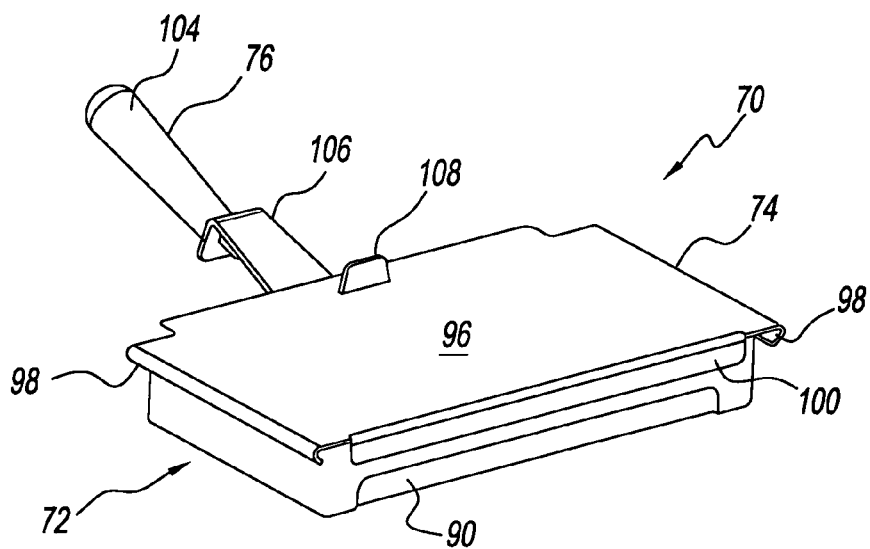
FIG. 5 is a perspective view of the smoker assembly of the oven of FIG. 1.

Referring to FIGS. 4 and 5, pan 70 includes a media container 72, a removable lid 74 and a handle 76. Media container 72 comprises a box having a front wall 78, a back wall 80, a bottom wall 82 and side walls 84 and 86. A plurality of vent holes 88 are disposed in front wall 78, bottom wall 82 and side walls 84 and 86 for smoke to escape into oven chamber 22.

A low profile slot 90 is disposed in back wall 80 to allow entry of heater element 50 into media container 72. Side walls 84 and 86 include at their upper edges flanges 92 for mating engagement with removable lid 74. Smoking media 94 can be inserted into media container and heated by heater element 50 to produce smoke that is vented via vent holes 88 into oven chamber 22. Smoking media 94 can be any suitable smoking material, such as, wood chips (flavored or natural), processed biscuits and the like.

Removable lid 74 includes a flat portion 96 that matches the shape of media container 72 (rectangular, square, circular, and the like). Flat portion 96 includes flanges 98 on its side edges that matingly engage flanges 92 of media container 72 for a sliding motion during installation on or removal from media container 72. Flat portion 96 also includes a stop member 100 that extends downwardly from its back edge to engage back wall 80 of media pan 72 to stop the sliding motion of removable lid 74 during installation. Flat portion 96 further includes a slot 102 that receives handle 76. Flat portion 96 is dimensioned so that when covering media container 72 a front part of flat portion 96 including slot 102 extends beyond front wall 78.

Handle 76 includes a grip 104 that is attached to a member 106 that has at its distal end and a vertical tab 108 that mates with slot 102 of removable lid 72.

Pan 70 has a low profile so as to fit between the lowermost rack 40 and bottom wall 40 of oven chamber 22. The end user can utilize all of the racks, thereby enhancing the cooking capacity. Pan 70 also is dimensioned with an overall area to accommodate an adequate amount of smoking media 94. Pan 70 is constructed with any suitable material and preferably is stainless steel. Pan 70 can be left in oven chamber 22 during a cleaning cycle of oven 20. Pan 70 can easily be installed and removed from oven chamber 22 for changing cooking conditions when smoking is desired or not desired. Heater element 50 is robust enough to withstand typical end user incidental contact (e.g., wire shelves, baking sheets and the like). Heater element 50 is designed to operate between 25 to 30 watts per square inch of surface area to provide an optimum heat of 430° F. for kindling wood (producing smoke) without igniting the wood (producing flame).

Figure 7:
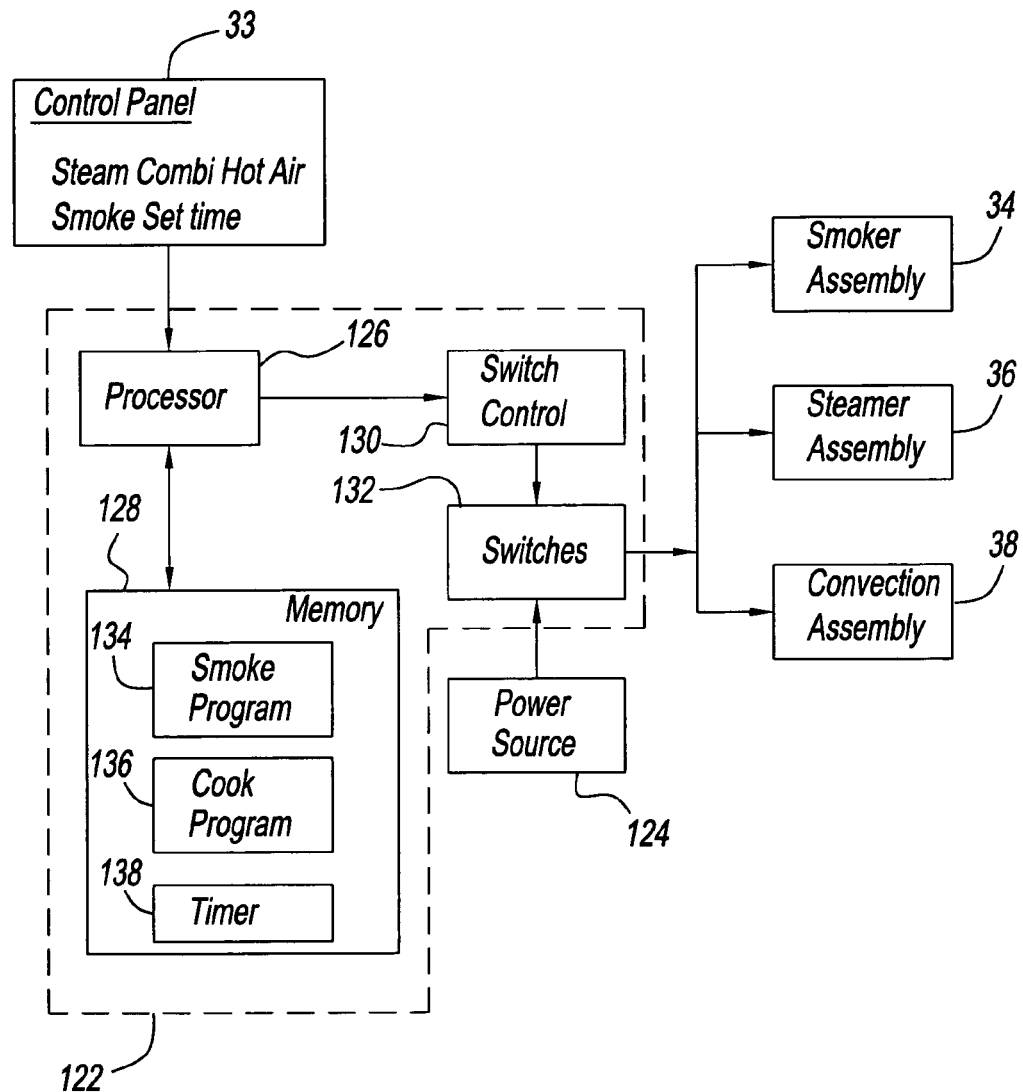
FIG. 7 is a block diagram of the control section of FIG. 2.

Referring to FIGS. 2 and 7, control section 32 houses a controller 122 and a power source 124. Control panel 33 includes buttons or other interface that allow an end user to select a steam mode, a hot air mode, a combi mode and a smoke mode. A combi mode includes convection heat and steam. Control panel 33 also includes a set time selector that allows the end user to select a set time, which, for example, is the amount of time smoker assembly 34 operates.

Controller 122 responds to end user selections on control panel 33 to control smoker assembly 34, steamer assembly 36 and heater assembly 38 to perform a cook procedure for a food product. Controller 122 includes a processor 126, a memory 128, a switch control 130 and switches 132. Memory 128 includes a smoke program 134, a cook program 136 and a timer 138. Although shown separately, smoke program 134, cook program 136 and timer 138 can be combined in one or two programs. For example, smoke program 134 and cook program 136 can be combined in one program. Alternately, cook program 136 may comprise a plurality of cook procedures. Smoke program 134 can be invoked by any of the cook procedures or by processor 126 when executing instructions of the cook procedures.

When the end user selects one of the cooking modes from control panel 33, processor 126 invokes one or more of the cook program(s) needed for the selected mode. Processor 126 then executes or runs the invoked program(s) by issuing commands to switch control 130 to control switches 132 to provide electrical energy from power source 124 to the selected one or more of smoker assembly 34, steamer assembly 36 and heater assembly 38.

Figure 8:
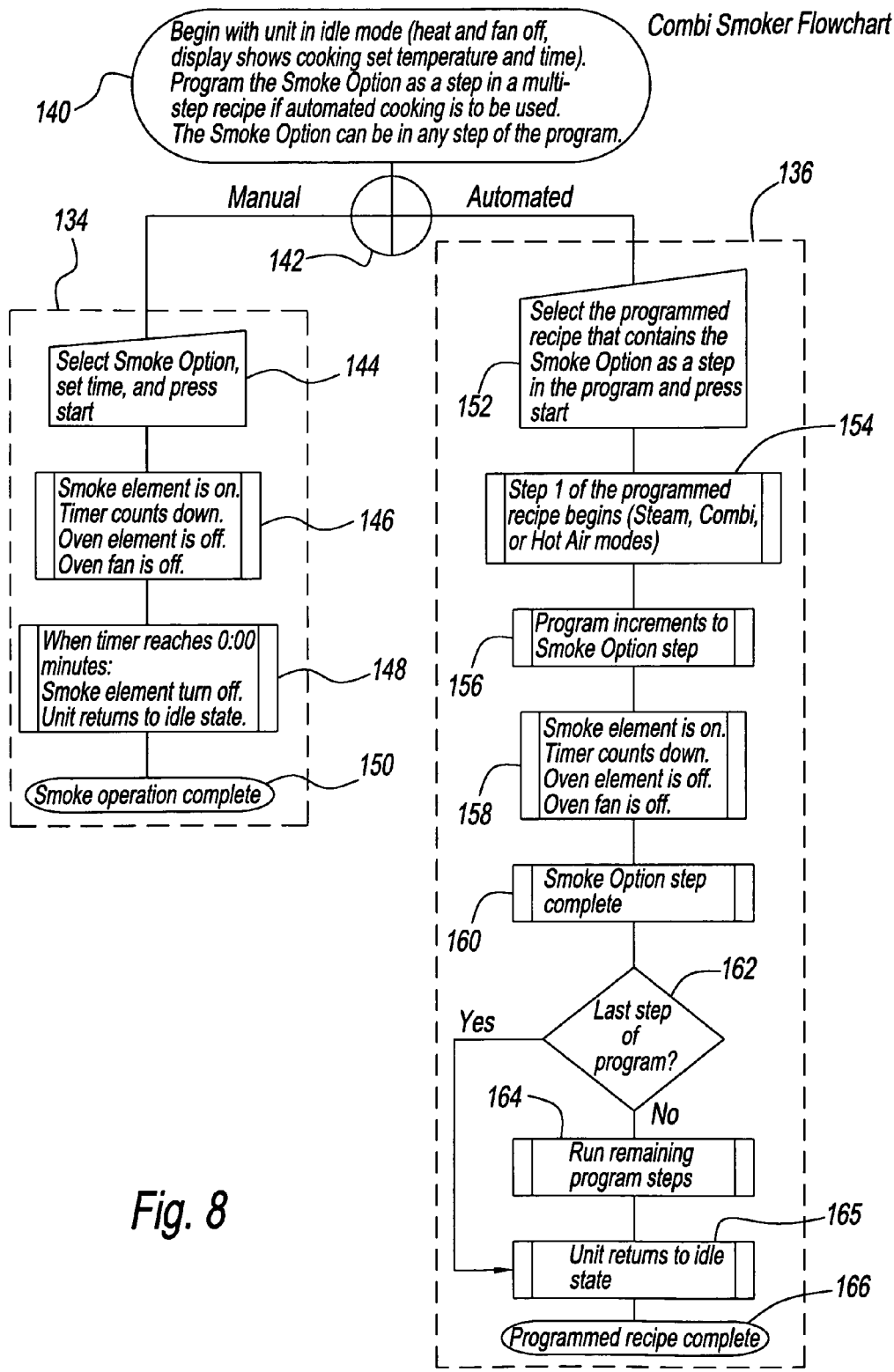
FIG. 8 is a flow diagram of the smoke program of the control assembly of FIG. 7.

Referring to FIG. 8, a flow diagram includes a combination of smoke program 134 and cook program 136. As noted at box 140, oven 120, for the purpose of the present description, is in an idle mode in which the convection fan and heater and the steamer are switched to an off idle position. For example, in the idle mode, processor 126 commands switch control 130 to turn the convection fan off, switch control 130 and control switches 132 to provide reduced power to the convection heater to maintain an idle temperature in oven chamber 22 and to turn steam assembly 34 off. A display (not shown) of control panel 120 shows cooking set time and temperature. The procedures may be either manual or automatic. If automatic, the display indicates the set time and the set temperature. If manual, the display indicates a set time of 00.00 and controller 122 awaits an end user entry of a set time.

Smoke program 134 can be incorporated into any step of an automatic cook program. Alternately, smoke program 134 can be manually performed prior to or at the end of execution of an automatic cook program. Box 142 represents a capability of smoke program 134 to be run manually.

If the end user selects smoke and manual from control panel 120, step 144 prompts the end user to enter a set time. At step 146, processor 126 responds to this selection and entry of set time to command switch control 130 to control switches 132 to turn on heater element 50 of smoker assembly 34 and initializes timer 138 to begin a count down. Also, processor 126 can keep the convection fan and the convection heater element off for the duration of the count down. At step 148, processor 126 responds to the count down reaching the end of count down (e.g., 00:00), by commanding switch control 130 to control switches 132 to turn heater element 50 of smoker assembly 34 off and to return oven 20 to the idle state. At step 150 the smoking operation is complete and smoke program 134 is exited.

Should the end user select from the control panel 120 an automatic cook procedure or recipe, which includes the smoke operation as a step, processor 126 responds to the pressing of a start button (not shown) at step 152. At step 154 processor executes the first step of the programmed recipe with the selected mode, steam, combi or hot air. At step 156 cook program 136 begins the smoke option. At step 158, processor 126 commands control switches 132 to turn on heater element 50 of smoker assembly 34 and causes timer 138 to begin a count down of a predetermined time. Also, processor 126 can keep the convection fan and the convection heater element off for the duration of the count down. At step 160 processor 126 responds to the timer reaching the end of the count down, by commanding switch control 130 to control switches 132 to turn off heater element 50 of smoker assembly 34. At step 162 it is determined if the last step of the recipe has been completed. If so, step 165 returns oven 20 to the idle state. If at step 162 it is determined that the recipe has more steps, the processor runs the remaining recipe steps. When the remaining steps of the recipe have been completed, at step 165 the processor returns oven 20 to the idle state. Box 166 represent the end of cook program 136 and processor 126 exits program 136.

The present invention having been thus described with particular reference to the preferred forms thereof, it will be obvious that various changes and modifications may be made therein without departing from the spirit and scope of the present invention as defined in the appended claims.

What is claimed is:

1. An oven for cooking food products comprising:
    an oven chamber comprising at least one side wall and a bottom wall;
    a thermal unit that supplies thermal energy to said oven chamber to cook a food product;
    a smoker assembly that supplies smoke to said food product; and
    a controller that comprises a processor, a cook program and a smoke program, wherein said processor executes said cook program and said smoke program to operate said thermal unit and said smoker assembly to supply said thermal energy and said smoke to cook said food product, wherein said oven chamber comprises a plurality shelf holders, wherein said smoker assembly comprises a heater element and a pan that contains a smoke media, wherein said pan and said heater element are shaped for disposition in said oven chamber below a lowermost one of said shelf holders and above said bottom wall, and wherein said heater element comprises an upper level which extends through said side wall and a lower level that supports said pan below said lowermost shelf holder and above said bottom wall.

2. The oven of claim 1, wherein said cook program includes a plurality of cook procedures, and wherein said cook program invokes said smoke program when executing at least one of said cook procedures.

3. The oven of claim 1, further comprising a plurality of switches and a power source, and wherein said processor controls connections of said thermal unit and said smoker assembly in circuit with said power source to provide said thermal energy and smoke in said oven chamber to cook said food product.

4. The oven of claim 1, wherein said thermal unit is a member of the group consisting of: a convection assembly, a steam assembly, a radiant heat assembly, a microwave and any combination thereof.

5. The oven of claim 1, further comprising a control panel, wherein said smoke program is invoked by a user making a manual selection from said control panel.

6. The oven of claim 1, wherein said smoke program is invoked by said processor based on execution of instructions of said cook program.

7. The oven of claim 1, wherein said heater element comprises first and second spaced apart legs in said upper level and in said lower level and a portion in said lower level that connects to said first and second legs, wherein each of said first and second legs include an incline between said upper and lower levels.

8. The oven of claim 1, wherein said pan comprises a slot and wherein said lower level of said heater element is disposed in said slot.

9. The oven of claim 8, wherein said pan further comprises a plurality of apertures that allow smoke to pass into said oven chamber.

10. The oven of claim 8, wherein said pan further comprises a lid that is installed and removed in a sliding motion.

11. The oven of claim 10, wherein said pan further comprises a handle that is removably attached to said lid.

12. A method for cooking food in an oven that includes an oven chamber that includes at least one side wall and a bottom wall, said method comprising:
    supplying thermal energy with a thermal unit to said oven chamber to cook a food product;
    supplying smoke with a smoker assembly to said food product; and
    controlling a processor with a cook program and a smoke program to operate said thermal unit and said smoker assembly to supply said thermal energy and said smoke to cook said food product, wherein said oven chamber comprises a plurality of shelf holders, wherein said smoker assembly comprises a heater element and a pan that contains a smoke media, wherein said pan and said heater element are shaped for disposition in said oven chamber below a lowermost one of said shelf holders and above said bottom wall, and wherein said heater element comprises an upper level which extends through said side wall and a lower level that supports said pan below said lowermost shelf holder and above said bottom wall.

13. The method of claim 12, wherein said cook program includes a plurality of cook procedures, and wherein said cook program invokes said smoke program when executing at least one of said cook procedures.

14. The method of claim 12, wherein said processor controls connections of said thermal unit and said smoker assembly in circuit with a power source to provide said thermal energy and smoke in said oven chamber to cook said food product.

15. The method of claim 12 wherein said thermal unit is a member of the group consisting of: a convection assembly, a steam assembly, a radiant heat assembly, a microwave and any combination thereof.

16. The method of claim 12, wherein said smoke program is invoked by a user making a manual selection from a control panel of said oven.

17. The method of claim 12, wherein said smoke program is invoked by said processor based on execution of instructions of said cook program.

18. The method of claim 12, wherein said pan comprises a slot and wherein said lower level of said heater element is disposed in said slot.

19. An oven for cooking food products comprising:
    an oven chamber comprising at least one side wall, a bottom wall, and a plurality of pan racks disposed on said side wall, wherein said pan racks include a plurality of shelf holders;
    a thermal unit that supplies thermal energy to said oven chamber to cook a food product; and
    a smoker assembly that supplies smoke to said food product;
    wherein said smoker assembly comprises a heater element and a pan that contains a smoke media, and wherein said pan and said heater element are shaped for disposition in said oven chamber below a lowermost one of said shelf holders and above said bottom wall, and wherein said heater element comprises an upper level which extends through said side wall and a lower level that supports said pan below said lowermost shelf holders and above said bottom wall.

20. The oven of claim 19, wherein said heater element comprises first and second spaced apart legs in said upper level and in said lower level and a portion in said lower level that connects to said first and second legs, wherein each of said first and second legs include an incline between said upper and lower levels.

21. The oven of claim 19, wherein said pan comprises a slot and wherein said lower level of said heater element is disposed in said slot.

22. The oven of claim 19, wherein said pan further comprises a plurality of apertures that allow smoke to pass into said oven chamber.

23. The oven of claim 19, wherein said pan further comprises a lid that is installed and removed in a sliding motion.

24. The oven of claim 19, wherein said pan further comprises a handle that is removably attached to said lid.

* * * * *